United States Patent [19]
Martin

[11] 3,782,408
[45] Jan. 1, 1974

[54] CONTINUOUS CONTACT DISTRIBUTOR FOR USE WITH IRRIGATION SYSTEMS

[75] Inventor: William T. Martin, Touchet, Wash.

[73] Assignees: Ivan C. Bohlnan; Vernon O. Bohlman, both of Walla Walla, Wash.; part interest to each

[22] Filed: May 26, 1972

[21] Appl. No.: 257,380

[52] U.S. Cl. .............................. 137/344, 239/177
[51] Int. Cl. .............................................. B05b 9/02
[58] Field of Search .................. 239/177; 310/232; 137/344

[56] References Cited
UNITED STATES PATENTS
3,659,627  5/1972  Zimmerer et al. ............. 239/177 X Primary Examiner—Allen N. Knowles
Assistant Examiner—A. Kashnikow
Attorney—Fred C. Matheny

[57] ABSTRACT

This distributor is used in connection with irrigation systems for irrigating large tracts of land. These systems comprise long horizontal sprinkler pipes made up of a plurality of sections connected with each other by flexible tubular couplings. One end of this sprinkler pipe is connected with a centrally positioned source of supply of water under pressure by an upright conduit formed of a rotatable part and a non-rotatable part. The sprinkler pipe is carried on supports called towers which rest on wheels. An electric motor drives the wheels of each tower and current to these towers is supplied through this distributor. The distributor comprises two parts of insulating material, one carrying slip rings and supported by the non-rotatable part and the other supported by the rotatable part and carrying contact members engaging the slip rings. A shroud encloses and shields both distributor parts. The walls of the distributor parts which carry the slip rings and contacts are of stepped construction to provide adequate spacing and insulation of each set of rings and contacts relative to adjacent sets.

9 Claims, 9 Drawing Figures

CONTINUOUS CONTACT DISTRIBUTOR FOR USE WITH IRRIGATION SYSTEMS

BACKGROUND OF THE INVENTION

In irrigating large tracts of agricultural land it is common practice to pipe water under pressure to a predetermined, usually central, location on the tract, direct it upwardly through an upright conduit, termed a pivot, and outwardly through a substantially horizontal, elevated sprinkler pipe by which it is sprayed onto the ground or crops to be irrigated. The sprinkler pipe is connected with a rotatable part of the pivot and is supported for movement around the pivot by spaced apart mobile supporting structures termed towers. Each tower is carried on a set of wheels driven by an independently controlled electric motor which is capable of driving the tower in either a forward or reverse direction. Irrigation systems having sprinkler pipes in the order of one quarter mile long are frequent occurrences and it is desirable to be able to move the sprinkler pipes in either direction around their pivots.

These sprinkler pipes are each formed of a plurality of end to end adjoining sections communicatively and mechanically connected with each other by flexible couplings or connectors which permit each two adjoining sections to assume, within a limited range, various angles relative to each other. The towers are positioned substantially at the location of the flexible couplings and switch means controlling the energizing of the motor which drives each tower is provided at or near the location of each flexible coupling and is arranged to be operated automatically by variations in the angle between the two adjacent sprinkler pipe sections.

The circuit wires by which current is supplied to these switches extend between the switches and the pivot and they must be capable of moving in either direction around the pivot. It has heretofore been common practice to provide slack in these circuit wires at the location of the pivot and let them wind around the pivot as the sprinkler pipe travels around said pivot. This has been found to be objectionable because the wires are liable to bind on non-rotatable parts of the pivot and to be broken or damaged if they are wound too many times around the pivot. This usually makes it necessary to shut down the entire sprinkler system for the purpose of unwinding and servicing the wires and connecting them up again. To do this the supply of both electric current and water to the entire system must be shut off and then again turned on.

SUMMARY OF THE INVENTION

An object of my invention is to provide a continuous contact distributor which can be satisfactorily applied to the pivot of a sprinkler system of the type just hereinbefore described and which will operate in a satisfactory manner in maintaining continuous contact between a source of supply of electric current and a plurality of circuit wires leading from the pivot to motors and the control devices therefor which are spaced at intervals outwardly from the pivot along a sprinkler pipe.

Another object is to provide a continuous contact electric current distributor of compact construction which can be applied to the pivots of irrigation systems now in common use and which will provide, within the space limits afforded by said pivots, the required number of slip rings and slip ring contacts positioned far enough apart to avoid danger of arcing and which will comply with the codes and other requirements pertaining to electrical installations of this nature.

Another object is to provide a continuous contact distributor which is made in two separable halves so it can be applied to the pivots of irrigation systems now in common use without necessitating disassembly of said pivots.

Another object is to provide a distributor of this type comprising two shells of insulating material, each formed in two detachable halves, and disposed one within the other when assembled, one of said shells carrying slip rings and being secured to a fixed part of the pivot and the other shell carrying contact members and being secured to a rotatable part of the pivot and said distributor having a shroud or shield which completely encloses both of said shells and protects them from dirt and moisture.

Other objects of the invention will be apparent from the following description and accompanying drawings.

BRIEF DESCRIPTION OF THE DRAWINGS

Like reference numerals refer to like parts throughout the several views.

DESCRIPTION OF THE PREFERRED EMBODIMENTS

A preferred form of my continuous contact electric current distributor as it may appear when applied to the pivot of a well known type of irrigation system is shown in FIGS. 1 to 6. Said pivot comprises a lower, upright, non-rotatable pivot pipe or conduit 10 which is connected with suitable water pressure supply means. The pivot pipe 10 receives and rotatively supports an upper pivot pipe 11 which is connected by an elbow 9 with a relatively long approximately horizontal sprinkler pipe 15. The lower end of the upper pivot pipe 11 is provided with a sealing ring 12 which, when it is subjected to water pressure, will act as a seal and prevent upward flow of water between the walls of pipes 10 and 11. Brace and support members 13 extend convergently upward from a base 13' and are secured to the upper end portion of the lower pipe 10 to support and stabilize the upright pivot formed by pipes 10 and 11.

Figure 1:
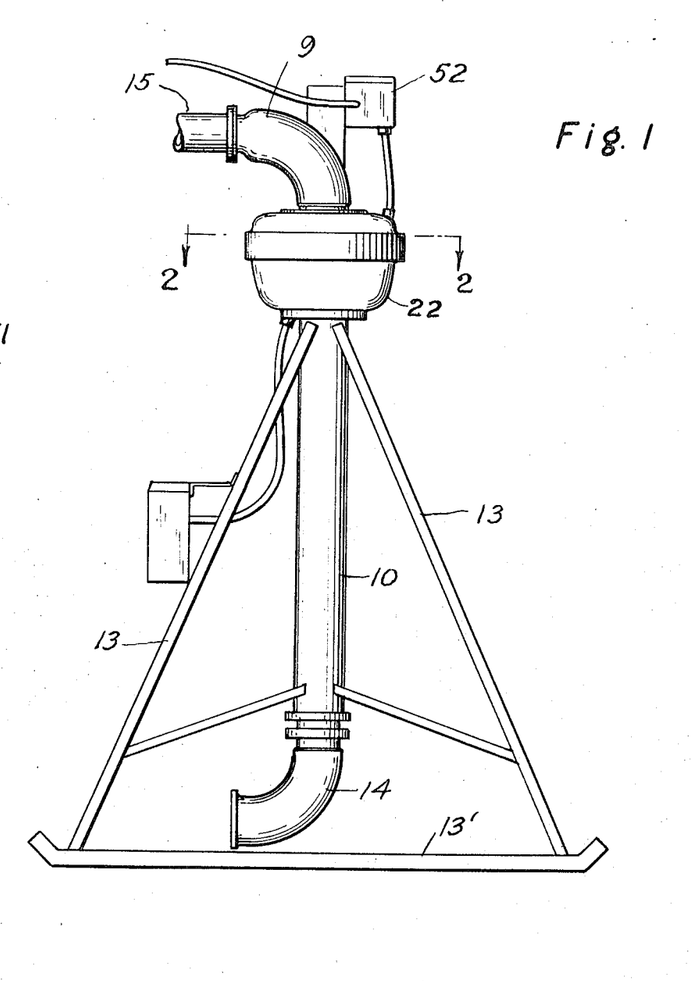
FIG. 1 is a view in elevation, with parts broken away, showing the pivot part of a sprinkler type irrigation system having my continuous contact distributor installed thereon.
Figure 2:
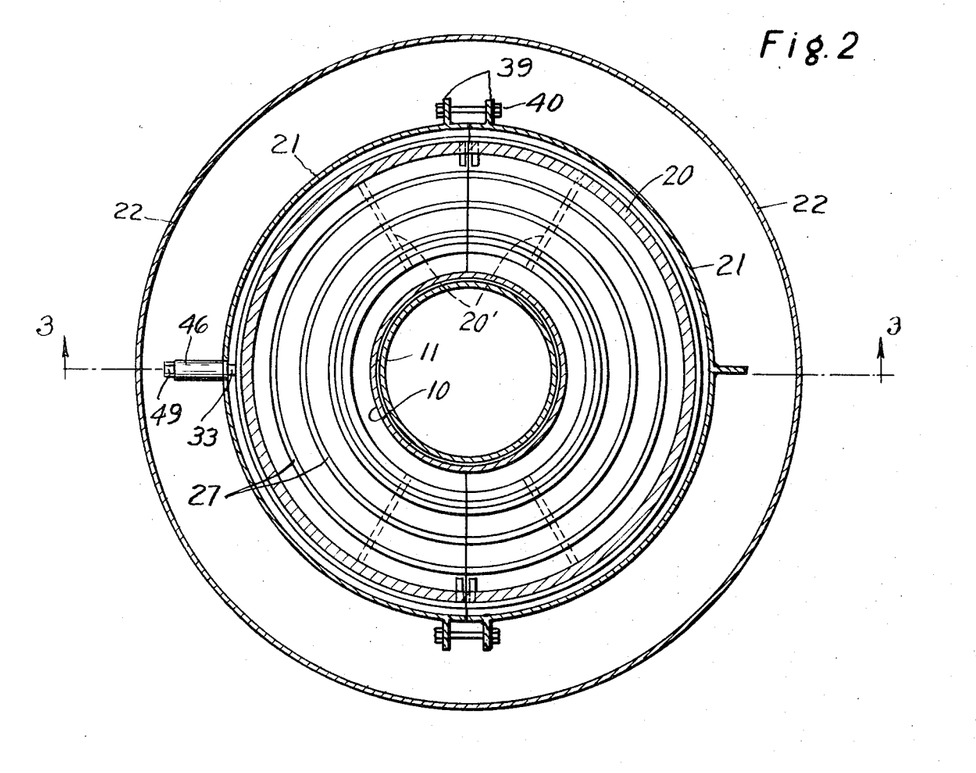
FIG. 2 is a horizontal sectional view taken substantially on broken line 2—2 of FIG. 1 and on a larger scale than FIG. 1, parts being shown in plan.
Figure 3:
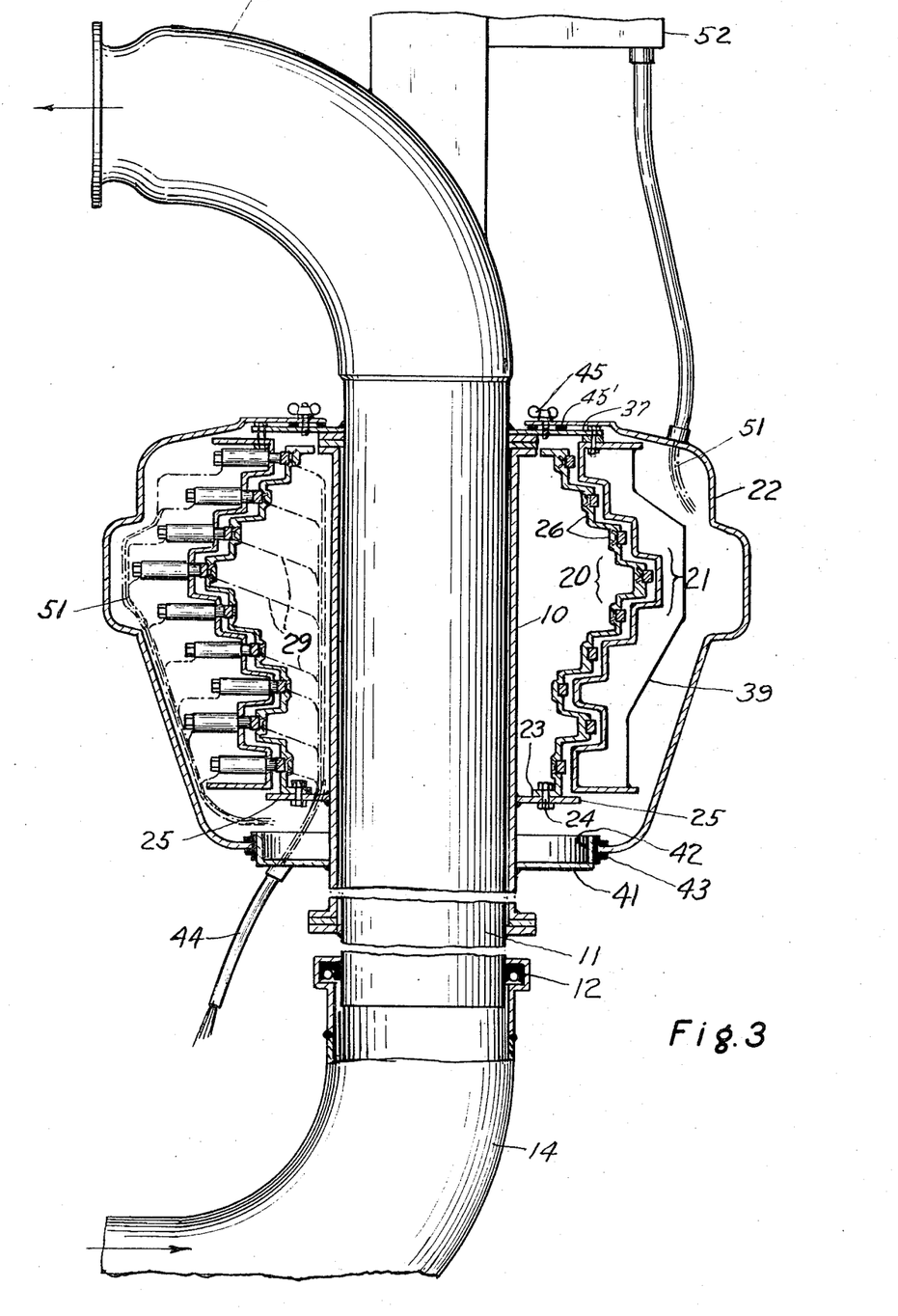
FIG. 3 is a vertical sectional view taken substantially on line 3—3 of FIG. 2 showing the distributor and parts of the pivot.
Figure 4:
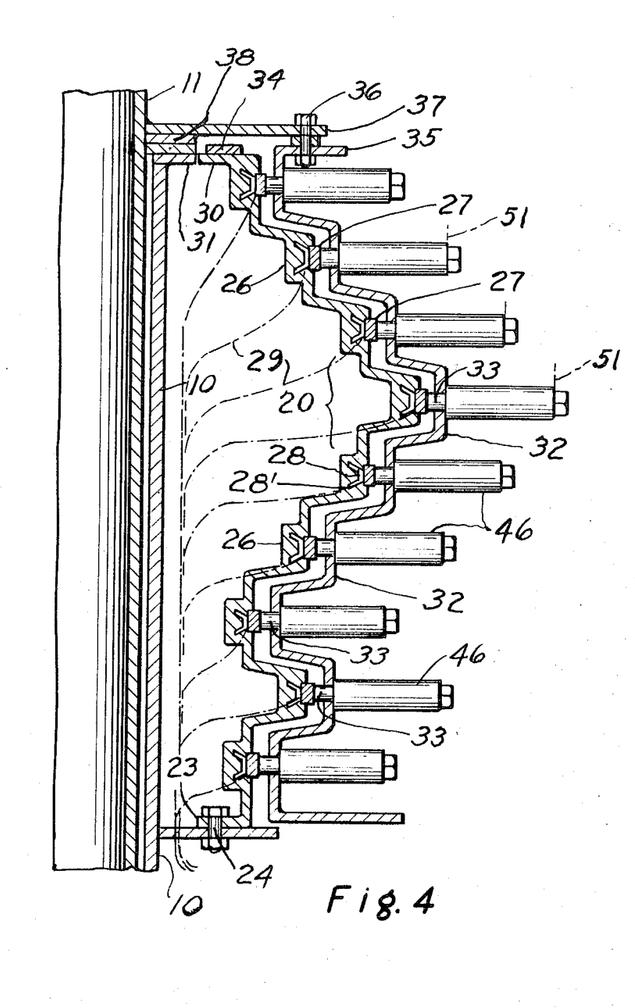
FIG. 4 is a fragmentary vertical sectional view on a larger scale than FIG. 3 showing parts of a sprinkler system pivot and a wall of an inner distributor shell which carries slip rings and a wall of an outer distributor shell which carries contact brushes.
Figure 5:
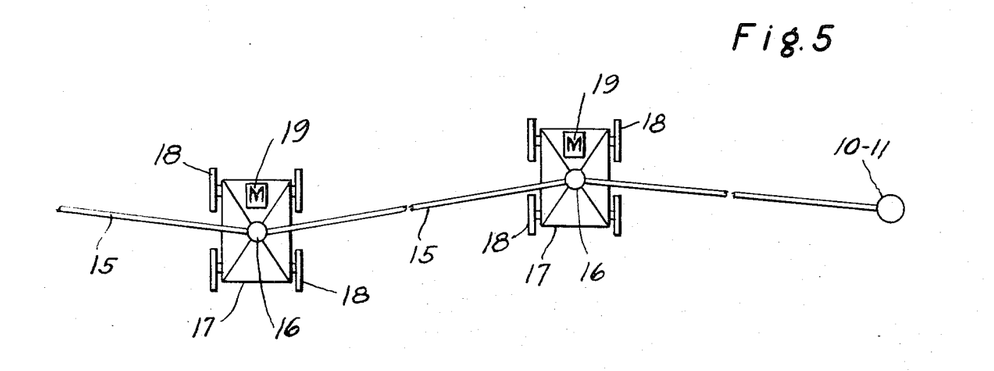
FIG. 5 is a small scale diagrammatic plan view illustrative of a tower supported mobile sprinkler pipe forming part of a sprinkler system to which this continuous contact distributor is applied.
Figure 6:
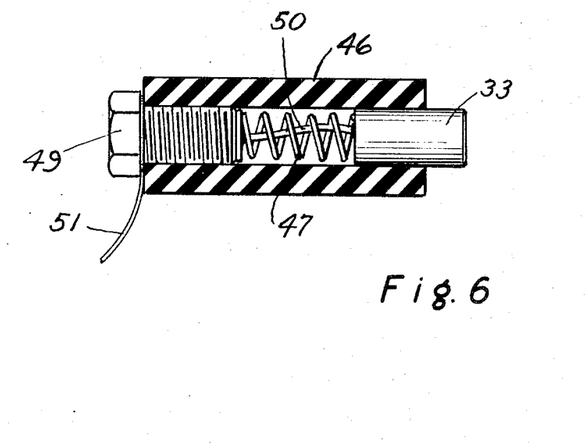
FIG. 6 is a detached longitudinal sectional view of one of the contact brushes.

As diagrammatically illustrated in FIG. 5 the sprinkler pipe 15 is formed of a plurality of end to end sections connected with each other by tubular flexible coupling members 16 which permit the several sections of said sprinkler pipe to assume a substantial single relative to each other. The sprinkler pipe 15 is supported at a substantial elevation above the ground and is movable around the pivot formed by pivot pipes 10 and 11. Supports 17, commonly called towers, support the sprinkler pipe 15 and are mounted on wheels 18 which can be driven in either direction by electric motors 19 to move sprinkler pipe 15 in either direction around its pivot. Current for the motors and for control means for the motors is supplied through suitable circuit wires hereinafter described and which are connected with my distributor. The motors 19 are controlled by automatic switch means, not shown, which is responsive to variations in the angles between adjacent sprinkler pipe sections. Voltage in the circuit wires leading to the motors and their control means usually varies from low voltage in some wires to about four hundred forty volts in others.

Referring first to FIGS. 1 to 6 the distributor therein shown comprises three hollow tubular parts 20, 21 and 22 of generally cylindrical shape herein termed shells. These shells are of different sizes and are each composed of two separable halves so they can easily be assembled around the pivot formed by pipes 10 and 11 and around each other or disassembled relative to said pivot and relative to each other without disassembly of the pivot.

The inner shell 20 is a slip ring carrying member. It has, at its lower end, an inwardly extending flange 23 which fits around the lower non-rotatable pipe 10 and is secured by stud bolts 24 to an outwardly extending flange ring 25 which is welded to the pipe 10. Preferably suitable longitudinally extending reinforcing ribs or braces 10' 20' are provided within each half of the inner shell 20.

All of the shells 20, 21 and 22 are formed of insulating material, which may be fiberglass or a phenolithic product, such as "BAKELITE." Also all of said shells have outwardly bulging or curving side walls. The side walls of the inner shell 20 are of stepped or offset shape so as to provide on the exterior of said shell a plurality of vertically spaced apart transversely offset cylindrical surfaces 26 to which electrically conductive slip rings 27 are attached. Each slip ring 27 is composed of two segments and each segment has at least one binding post 28, FIG. 4, which extends through the wall part 26 of the shell 20 and has an energized circuit wire 29 attached to it. The binding posts 28 together with integral prongs 28' on the slip rings cooperate in securing said slip to the shell 20.

When the shell 20 is assembled on the lower pipe 10 the adjoining ends of the two segments which form each slip ring 27 will usually be in electrical contact with each other and there will not be much danger of arcing between these adjoining ends. Connecting an energized circuit wire 29 with each segment of each slip ring provides a further safeguard against arcing between these adjoining ends.

The transverse offsetting of the cylindrical surfaces 26 and the vertical spacing of the slip rings 27 carried by these surfaces makes it possible to position the slip rings farther apart on a shell of limited length than said rings could be positioned if they were not thus spaced and offset. The wall portions of shell 20 which extend between the ring carrying parts 26 serve as shelves on which any dust that gets into the space between the two shells 20 and 21 can settle wuthout danger of fouling or short circuiting the rings 27.

The upper end portion of the inner shell 20 has an inwardly extending annular flange 30 which registers with and extends around a flange ring 31 on the upper end of the non-rotatable pipe 10. the two halves of inner shell 20 can be secured together at their upper ends by a thin metal plate 34 detachably attached to flange 30 by screws or other readily removable means.

The inside walls of shell 21 are of stepped or offset configuration similar to the outer walls of shell 20 and said shell 21 is of enough larger size than the shell 20 so that a clearance space is left between these two shells when they are in assembled relation. Said shell 21 has vertically spaced apart transversely offset cylindrical wall parts 32 which register with the wall parts 26 of shell 20 and which carry inwardly protruding contact brushes 33 of a form more fully hereinafter described. These brushes 33 make continuous electrical contact with the slip rings 27. The shell 21 terminates at its upper end in an outward extending flange 35 which is secured by bolts 36 to a downwardly offset marginal part of an external flange ring 37. Said flange ring 37 is welded to the upper rotatively supported pivot pipe 11 above the top flange 31 of the lower pivot pipe 10. This secures the two halves of upper shell 21 together at their upper ends and secures shell 21 to upper pipe 11 so they will rotate together. A bearing and thrust washer 38 is provided between flange 37 of upper pipe 11 and the top flange 31 of lower pipe 10.

Preferably each half of the outer shell 21 is provided with two external reinforcing ribs 39 positioned parallel with and close to its respective lateral edges and the two halves of said shell 21 are detachably secured together by tie bolts 40 which extend through and connect ribs 39. The shroud 22 is of substantially larger size than the shell 21 and has an inwardly extending upper part which rests on the flange 37 and is secured to it by cap screws 45. Preferably gaskets 45' to seal against dust and moisture are provided between flange 37 and shroud 22. The shroud 22 is thus supported for movement along with shell 21 around pipe 10 and shell 20. An external flange ring 41 is secured to the lower pipe 10 a short distance below the flange 25 and is provided with an upwardly extending cylindrical peripheral part 42. A sealing ring 43 of elastic material is secured to the inner edge portion of the bottom part of shroud 22 and maintains a tight dust and moisture proof contact with part 42 as the shroud and shell 21 rotate. An insulated cable 44 containing the circuit wires 29 passes upwardly through flange 41 and through the flange 25 to which the lower end of shell 20 is secured.

Each contact brush 33 is slidably disposed in a tubular brush holder 46 of insulating material which is rigid with the shell 21 and extends outwardly in a general radial direction. Each brush 33 bears against one end of a compression spring 47 and the other end of spring 47 bears against a screw 49 which is threaded into the outer end of the tubular holder 46. A wire 50 of soft and yieldable but electrically conductive material extends between brush 33 and screw 49 and has one end attached to the brush and the other end attached to the screw. The wire 50 and spring 47 each serve as electrical conductors between the brush 33 and screw 49 and the wire 50 holds brush 33, screw 49 and spring 47 in assembled relation for convenient handling in inserting and removing them from the tube 46. A circuit wire 51 is electrically connected with the head of each screw 49. The several circuit wires 51 are gathered together in cable form and conducted out of the shell 21 and shroud 22 through suitable dust and moisture tight conduit means to a location where said wires 51 can be electrically connected with other wires, preferably in a cable, which lead outwardly along the sprinkler pipe 15 to the several electrically actuated devices which move said sprinkler pipe around the pivot and which control its movement. The connection of wires 51 with the wires leading to the sprinkler pipe moving and control means can be made in a junction box 52 or it can be made by conventional type plug-in connector means.

Preferably one half of the shell 21 is provided with two rows of brush holders 46 positioned adjacent its respective lateral edges and the other half of said shell 21 has one row of similar brush holders 46 positioned about mid way between its two lateral edges. Since each brush holder carries a contact brush 33 this positions the brushes so there will always be at least one brush in electrical contact with each segment of each slip ring 27 and this minimizes the danger of arcing when the brushes 33 move across the adjoining ends of the segments of said slip rings.

The operation of the distributor shown in FIGS. 1 to 6 is believed to be apparent from the foregoing description. As the sprinkler pipe is moved around the pivot formed by the two pivot pipes 10 and 11 the brush carrying shell 21 will be moved with it and the brushes 33 will maintain efficient contact with the slip rings 27 without danger of arcing thus making possible continuous operation of the sprinkler system without requiring it to be shut down for servicing of electric circuit wires.

Figure 7:
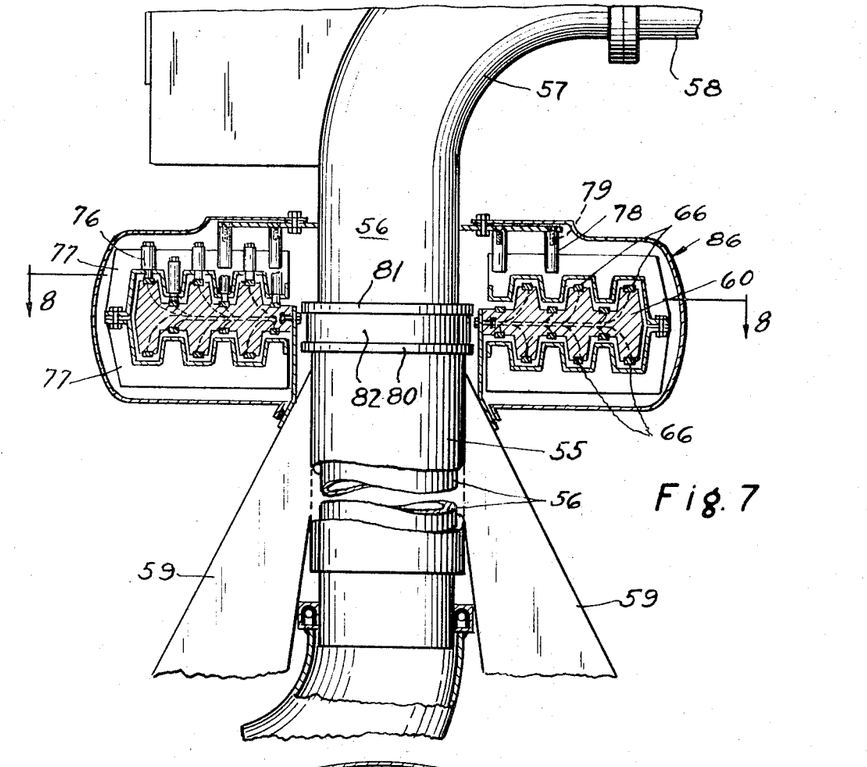
FIG. 7 is a view partly in vertical section and partly in elevation showing a continuous contact electric current distributor of modified form.
Figure 8:
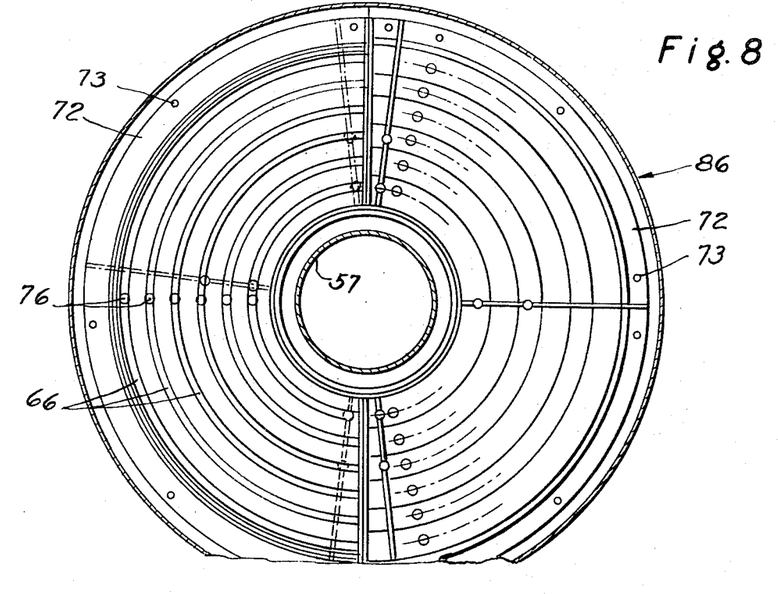
FIG. 8 is a view partly in horizontal section and partly in plan taken substantially on broken line 8—8 of FIG. 7.
Figure 9:
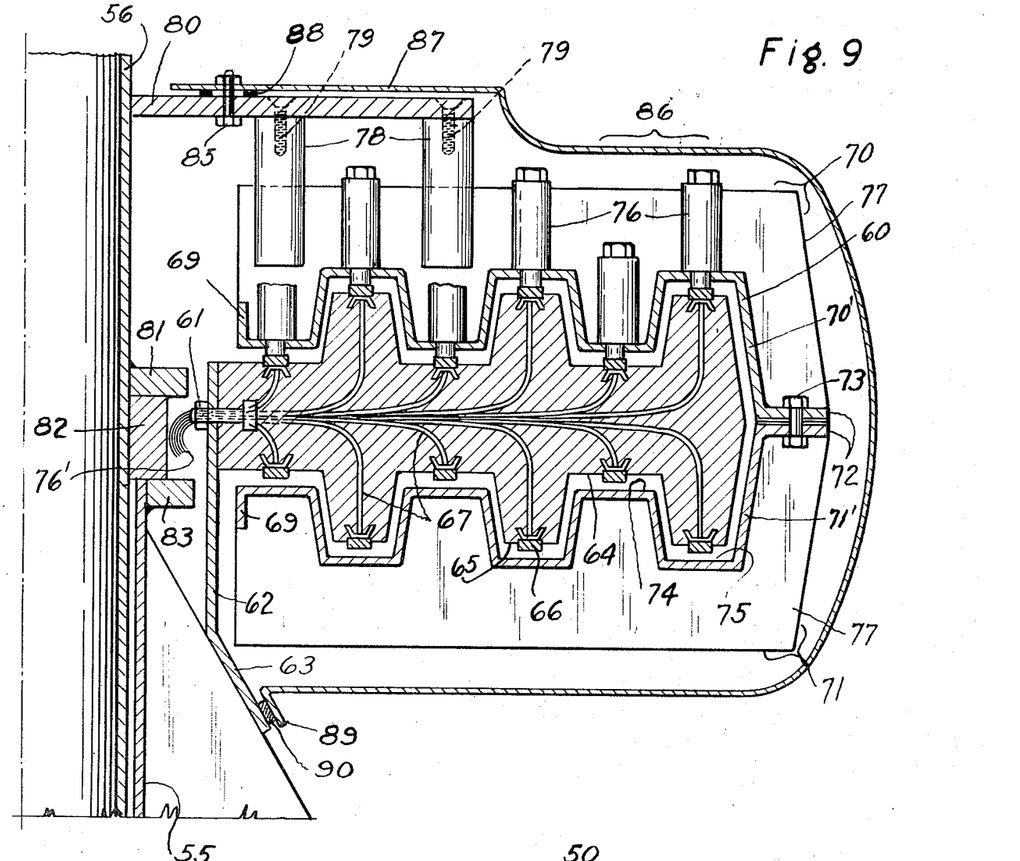
FIG. 9 is a fragmentary vertical sectional view on a larger scale than FIGS. 7 and 8 illustrating parts of the distributor shown in FIGS. 7 and 8.

In the form of this invention shown in FIGS. 7, 8 and 9 numeral 55 indicates a lower, fixed and non-rotatively supported upright water supply pipe and 56 indicates an upper pipe which is rotatively supported within the lower pipe 55 and extends above the upper end of the same. Upper pipe 56 is connected by an elbow 57 with a generally horizontal sprinkler pipe 58. Pipes 55, 56 and 58 are similar to previously described pipes 10, 11 and 15.

The lower pipe 55 is supported in an upright position by a plurality of angularly spaced, flat, braces 59 which have their inner edges rigidly secured, as by welding, to the pipe 55 and have their outer edges convergently tapered toward pipe 55, upwardly considered. The parts just hereinbefore described are employed in many sprinkler installations now in common use. The distributor shown in FIGS. 7 to 9 is designed for applications to these systems.

Said distributor comprises a non-rotatively supported slip ring carrying core or member 60 which is secured by stud bolts 61 to a cylindrical attachment bracket 62. Said bracket 62 terminates at its lower end in an outwardly flaring or bell shaped flange 63 which is welded to the inclined outer edges of the braces 59. Said ring carrying member 60 is of circular shape and has a central opening within which the bracket 62 is disposed. Said ring carrying member 60 and the bracket 62 are preferably constructed in two separable semi-circular parts or halves so they can be applied to the pivot formed by pipes 55 and 56 without disassembly of said pivot. However each can be made in one part if desired.

Said ring carrying member 60 is provided on both its top and bottom sides with a plurality of alternating, concentric, circular grooves 64 and lands 65 each of substantial width. The grooves 64 are divergent and the lands 65 are convergent from their bottoms outwardly. A slip ring 66 of electrically conductive material is provided in the bottom of each groove 64 and on the top or outer face portion of each land 65. The ring carrying member 60 is preferably made of fiberglass or "BAKELITE" or similar insulating material and preferably the slip rings 66 are partially imbedded or inlayed into this material to secure them to said member 60. A circuit wire 67 is electrically connected with each segment of each slip ring 66 and embedded in the ring carrying member 60 at the time of manufacture. All of these circuit wires 67 extend toward center out of member 60 and are brought together in cable form and connected wuth a suitable source of supply of electric current. When the slip ring carrying member 60 and slip rings 66 are made in two parts and a circuit wire 67 is connected with each ring segment both the danger of arcing between the ends of the ring segments and the danger of making inefficient contact with the rings 66 are minimized.

Providing slip rings 66 on both the upper and the lower sides of member 60 makes possible the use of a large number of slip rings in proportion to the diameter of said member 60. The provision of the alternate annular grooves 64 and lands 65 offsets the rings 66 both in axial and radial directions relative to the member 60 and facilitates spacing the rings farther apart on a ring carrying member of limited diameter than would otherwise be possible and this minimizes the danger of arcing and short circuits and facilitates complying with electrical requirements, codes and like regulations.

The rotatively supported brush carrying member used in this construction in connection with ring carrying member 60 comprises two circular or disc shaped parts 70 and 71 each formed of insulating material, such as fiberglass. Each part 70 and 71 has a central opening within a reinforcing or stiffening flange 69 and each part 70 and 71 is preferably formed of two separable semi-circular halves. Part 70 is herein referred to as an upper part and part 71 as a lower part. Both parts 70 and 71 are of larger diameter than the ring carrying member 60 and they are provided respectively with peripheral side walls 70' and 71' which have outwardly extending flanges 72 to receive bolts 73 by which said parts 70 and 71 are secured together with their concave sides facing each other so they substantially enclose the ring carrying member 60 when assembled. Brush carrying parts 70 and 71 are each shaped so as to provide, on the sides thereof adjacent member 60, alternate annular lands 74 and grooves 75 which interfit respectively with the grooves 64 and lands 65 of said member 60. Preferably one semicircular part of half of the brush carrying part 70 is provided with two angularly spaced radial rows of tubular brush holders 76 with the holders 76 in each row spaced apart the correct distance to conform to the spacing of the slip rings 66 in radial directions. The other half of each upper part 70 is provided with a single radial row of similar brush holders 76.

The two halves of the lower brush carrying part 71 are similarly provided respectively, one with two radial rows and the other with one radial row, of similar brush holders 76. Brush means similar to that shown in FIG. 6 and hereinbefore described is provided in each brush holder 76 and is connected with a suitable circuit wire 76' which extends outwardly along the sprinkler pipe 58 to a motor or other electrical device to which current is to be supplied. The provision of three radial rows of brushes spaced at about equal angles apart in the two halves of each brush carrying member 70 and 71 insures that there will always be at least one brush in contact with each segment of each slip ring 66 and this substantially eliminates the danger of arcing.

Each half of each brush carrying member 70 and 71 is provided on its outer side with a plurality of radial reinforcing ribs or members 77 for stiffening purposes. The two halves of the upper brush carrying member or part 70 are each provided near their inner edges with a plurality of attachment members 78, shown in FIG. 9 to be integral with the ribs 77. Each attachment member 78 has in it a threaded hole to receive a cap screw 79 by which it is secured to a rigid annular flange 80 on the rotatively supported upper pipe 56 when the distributor is operatively assembled on the pivot formed by pipes 55 and 56. Flange 80 is welded to pipe 56. Pipe 56 also has another flange ring 81 welded to it a short distance below flange 80 and a bearing sleeve 82 is positioned between the flange 81 and another flange ring which is rigid with the upper end of lower non-rotatively supported pipe 55. The cylindrical attachment bracket can be welded to flange 83 if desired. Said flange 83 prevents dust and moisture from passing upwardly between pipe 55 and bracket 62.

A shroud or shield 86 in the form of a circular shell of insulating material made in two semi-circular halves is provided to fit over and envelop and protect the ring and brush carrying parts of the distributor, An inwardly extending edge portion 87 of the shroud 86 rests on and is secured by cap screws 85 to the flange 80 on upper pipe 56. The shroud 86 rotates with the upper pipe 56 and brush carrying parts 70 and 71. Preferably gasket means 88 is provided between the shroud part 87 and the flange 80 for sealing purposes. The innermost lower edge of the shroud 86 is provided with an oblique flange 89 and a sealing member 90 of elastic material is carried by said oblique flange 89 and maintains sealing contact with the bell shaped skirt 63 on the lower end of bracket 62 as the shroud rotates.

The operation of the distributor shown in FIGS. 7. 8 and 9 is substantially the same as the operation of the distributor show in FIGS. 1 to 6 inclusive.

I claim:

1. The combination with a sprinkler system which includes an upright pivot comprising a non-rotatively supported pipe and a rotatively supported pipe positioned in telescopic relation and in water tight relation one within the other, said rotatively supported pipe extending above said non-rotatively supported pipe; of an inner shell of insulating material of generally cylindrical shape and of substantially larger diameter than said non-rotatively supported pipe extending around and secured to said non-rotatively supported pipe; slip rings of electrically conductive material rigid with the outer wall of said inner shell and positioned in vertically spaced apart relation and in transversely offset relation to each other; and an outer shell of insulating material and of generally cylindrical shape and of larger size than said inner shell enclosing said inner shell and secured to and rotatable with said rotatively supported pipe; and electrically conductive contact brushes carried by said outer shell and engaging said slip rings.

2. The apparatus as claimed in claim 1 in which each of said shells is made in two halves separable from each other, whereby they can be applied to and removed from the pivot without disassembling said pivot.

3. The apparatus as claimed in claim 1 in which each shell is secured to the pipe by which it is carried by a flange ring which is welded to the pipe.

4. The apparatus as claimed in claim 1 in which the external walls of the inner shell are shaped to provide thereon a plurality of vertically spaced apart transversely offset cylindrical surfaces connected by shelf like annular parts and in which the slip rings are mounted on said vertically spaced apart transversely offset cylindrical surfaces.

5. The apparatus as claimed in claim 1 in which the external walls of the inner shell are shaped to provide thereon a plurality of vertically spaced apart transversely offset cylindrical surfaces connected by shelf like annular parts and in which the slip rings are mounted on said vertically spaced apart transversely offset cylindrical surfaces and the interior walls of the outer shell are shaped to provide therein a plurality of vertically spaced apart transversely offset cylindrical surfaces positioned in registration respectively with the cylindrical surfaces on the exterior of the inner shell when the two shells are in assembled relation and the contact brushes protrude inwardly from said cylindrical surfaces of said outer shell.

6. The combination with a sprinkler system including a movably generally horizontal sprinkler pipe having one end connected by an upright pivot with water supply means, said pivot comprising a lower non-rotatively supported pivot pipe and an upper pivot pipe rotatively supported within said lower pivot pipe and extending above said lower pivot pipe and connected with said sprinkler pipe, of a disc shaped slip ring carrier of insulating material rigidly secured in a horizontal position and non-rotatively supported by said lower pivot pipe; slip rings of electrically conductive material and of progressively increasing diameters supported in generally concentric spaced apart relation on a side of said slip ring carrier; electric current supply means connected with said slip rings; a disc shaped contact brush carrier of insulating material secured to and rotatable with said upper pivot pipe and positioned in face to face spaced apart relation to said slip ring carrier; contact brushes carried by said contact brush carrier and positioned to contact said slip rings; and circuit wires connected with said contact brushes.

7. The apparatus as claimed in claim 6 in which the disc shaped slip ring carrier has slip rings on both its upper and its lower sides and in which the contact brush carrier has an upper brush carrying part and a lower brush carrying part each provided with contact brushes positioned respectively to contact the slip rings on both the upper and lower sides of the slip ring carrier.

8. The apparatus as claimed in claim 6 in which the disc shaped slip ring carrier and the disc shaped contact brush carrier are each made in two halves separable along diametrical planes, whereby they can be attached to and detached from an upright pivot pipe of an irrigation system without disassembly of the pivot.

9. The apparatus as claimed in claim 6 in which the disc shaped slip ring carrier has slip rings on both its upper and its lower sides and is made in two halves separable along a diametrical plane and in which the disc shaped contact brush carrier comprises an upper part positioned above said slip ring carrier and a lower part positioned below said slip ring carrier, said upper and lower parts being detachably connected with each other outwardly from the periphery of said slip ring carrier and the upper and lower parts of said contact brush carrier each being provided with contact brushes positioned to contact said slip rings, said upper and lower parts each being made in two halves separable along diametrical lines, said slip ring carrier and said contact brush carrier being applicable to and removable from a sprinkler system pivot without disassembly of the pivot.

* * * * *